(12) United States Patent
Riedl

(10) Patent No.: US 9,731,689 B2
(45) Date of Patent: Aug. 15, 2017

(54) HEIGHT-ADJUSTABLE SUPPORT FOR SEMI-TRAILERS OR THE LIKE

(71) Applicant: SAF-HOLLAND GmbH, Bessenbach (DE)

(72) Inventor: Reinhold Riedl, Berlin (DE)

(73) Assignee: SAF-HOLLAND, GmbH, Bessenbach (DE)

( * ) Notice: Subject to any disclaimer, the term of this patent is extended or adjusted under 35 U.S.C. 154(b) by 0 days.

(21) Appl. No.: 14/422,101

(22) PCT Filed: Aug. 30, 2013

(86) PCT No.: PCT/EP2013/067977
§ 371 (c)(1),
(2) Date: Feb. 17, 2015

(87) PCT Pub. No.: WO2014/040867
PCT Pub. Date: Mar. 20, 2014

(65) Prior Publication Data
US 2015/0224966 A1    Aug. 13, 2015

(30) Foreign Application Priority Data

Sep. 11, 2012 (DE) .................. 10 2012 216 033

(51) Int. Cl.
*B60S 9/08* (2006.01)
*B60S 9/04* (2006.01)
*B60S 9/12* (2006.01)

(52) U.S. Cl.
CPC . *B60S 9/04* (2013.01); *B60S 9/12* (2013.01); *B60S 9/08* (2013.01)

(58) Field of Classification Search
None
See application file for complete search history.

(56) References Cited

U.S. PATENT DOCUMENTS

| 5,423,518 A | 6/1995 | Baxter |
| 6,141,997 A | 11/2000 | Blehi, III |

(Continued)

FOREIGN PATENT DOCUMENTS

| CN | 2327575 | 7/1999 |
| CN | 202107473 | 1/2012 |

(Continued)

OTHER PUBLICATIONS

International Search Report, European Patent Office, Oct. 11, 2013.

*Primary Examiner* — J. Allen Shriver, II
*Assistant Examiner* — Hilary L Johns
(74) *Attorney, Agent, or Firm* — Price Heneveld LLP

(57) ABSTRACT

The invention relates to a supporting device of a vehicle, in particular of a semi-trailer or trailer, comprising an outer pipe which is designed to be attached to the vehicle in a stationary manner, an inner pipe which is arranged in the outer pipe so as to be movable in the insertion and extension direction, an actuating device for moving the inner pipe between a transport position and an operating position, and an engagement device which is designed, in a first operating state, to fix the inner pipe in the operating position in relation to the outer pipe in such a way that a movement of the inner pipe in the insertion direction is prevented.

25 Claims, 7 Drawing Sheets

(56) References Cited

U.S. PATENT DOCUMENTS

| | | | |
|---|---|---|---|
| 6,726,247 B1 * | 4/2004 | Snyder | B60S 9/04 254/45 |
| 7,097,158 B2 | 8/2006 | BarBaruolo | |
| 7,377,488 B2 | 5/2008 | Schutt | |
| 2006/0283646 A1 | 12/2006 | Schutt | |

FOREIGN PATENT DOCUMENTS

| | | | |
|---|---|---|---|
| DE | 4018236 | 12/1991 | |
| DE | 4406362 | 9/1995 | |
| DE | 4422501 | 1/1996 | |
| DE | 4446931 | 7/1996 | |
| DE | 19705275 | 9/1998 | |
| DE | 10241905 | 3/2004 | |
| EP | 0529958 | 3/1993 | |
| EP | 0675029 | 10/1995 | |
| EP | 0688687 | 12/1995 | |
| EP | 1104369 | 6/2001 | |
| GB | WO 2012056242 A1 * | 5/2012 | B60S 9/12 |
| WO | 2012056242 | 5/2012 | |

* cited by examiner

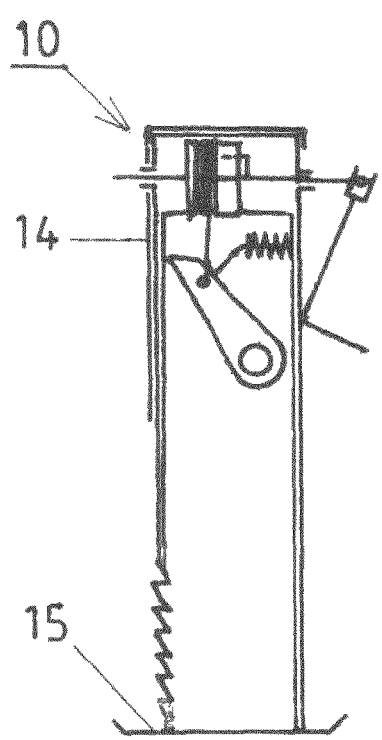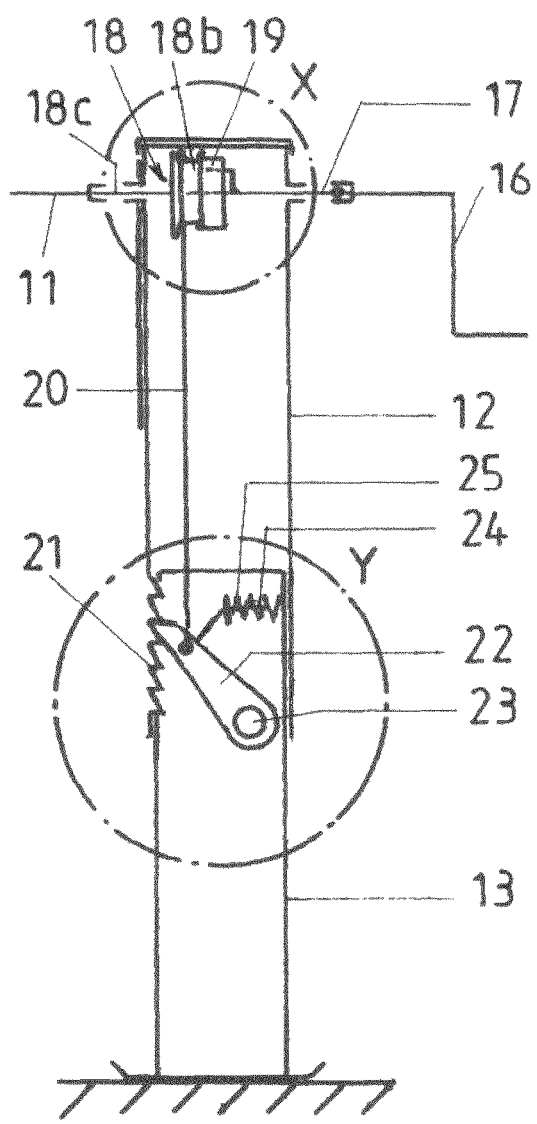

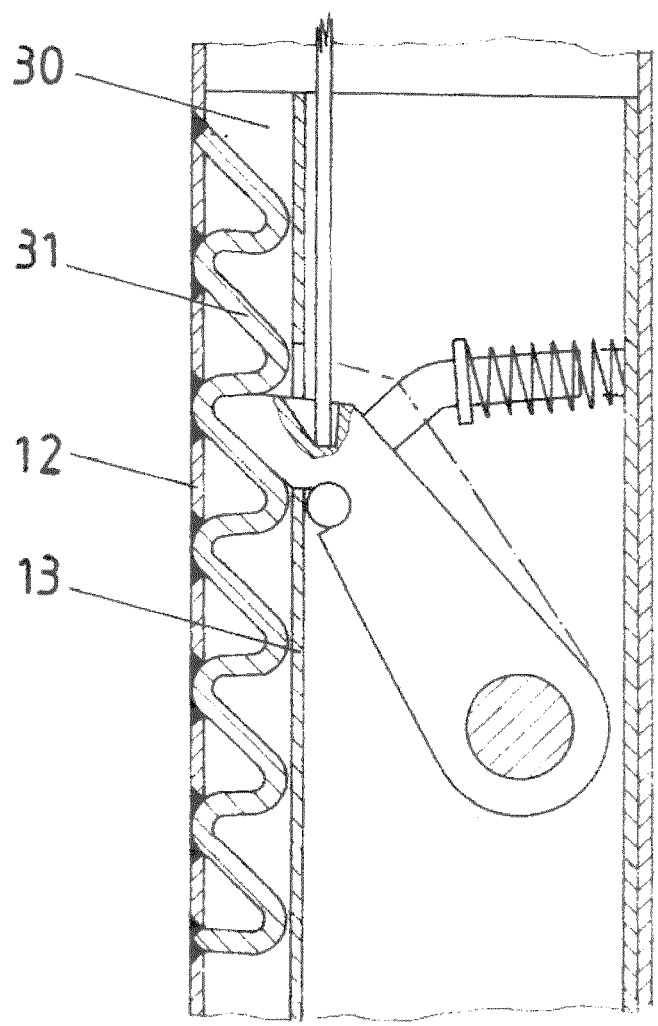

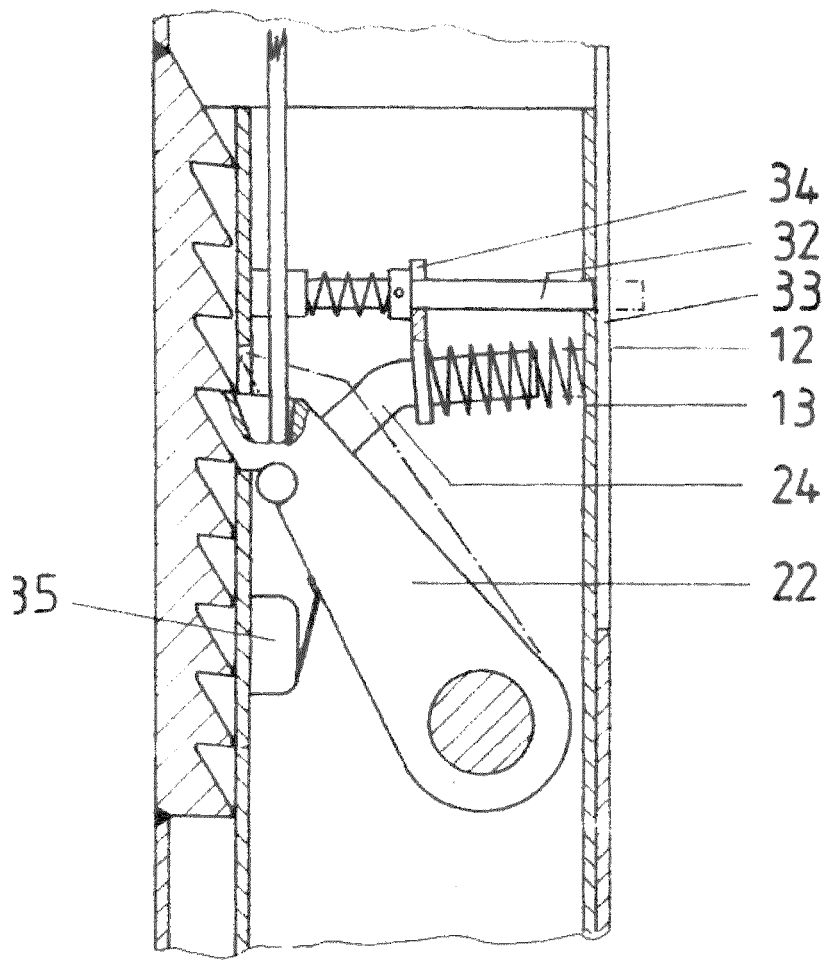

HEIGHT-ADJUSTABLE SUPPORT FOR SEMI-TRAILERS OR THE LIKE

BACKGROUND OF THE INVENTION

The invention relates to a height-adjustable support for semi-trailers or the like or a supporting device of a vehicle, in particular of a semi-trailer or of a trailer.

Such supports are arranged in pairs at the front of semi-trailers and can be brought telescopically into the support or transport positions. Such supports are known from EP 0 675 029 and EP 1 104 369 B2, for example. Said supports have drive mechanisms, which can be driven by means of hand cranks and which have a fast gear to be extended into the support position or to be retracted into the transport position, and a low gear, by means of which the front area of the semi-trailer can be lifted or lowered. In addition to the drive mechanisms, the mechanical outlay is further increased by spindle drives, bearing parts etc., which causes substantial manufacturing costs and unfavorably a high support weight. In practice, it is particularly disadvantageous that even in the so-called fast gear approx. 20 crank rotations are necessary to extend or retract the support, which is the case for all other such supports on the market. In order to save this onerous physical labor and the time required therefor for the driver, it was tried to provide a motor drive. This led to the solution proposed in DE 102 41 905 A1. Here, a motor unit is attached to each pair of the supports, which means additional attachment and securing elements and further mechanical outlay and, thus, an increase in weight. Modern tractor trailers with air-sprung rear axle assemblies can also lift or lower the front area of a semi-trailer via the fifth wheel during hitching and unhitching. Winding up or lowering by means of the semi-trailer supports is therefore not necessary. Instead, in practice, only a very fast load-free extension and retraction of the supports from the transport position into the support position and vice versa is of utmost priority. In addition, a support as a utility vehicle component and product of large-scale production should be as light-weight as is possible and be inexpensive to manufacture.

The object underlying the invention is to provide a height-adjustable support or supporting device for semi-trailers, which can be brought into its support position and also back into the transport position very rapidly, i.e. with few crank rotations only or with an efficient power drive, wherein the support is light-weight, the manufacturing outlay is small and the manufacturing costs are low.

SUMMARY OF THE INVENTION

According to the invention, there is provided a supporting device of a vehicle, in particular of a semi-trailer or trailer, comprising an outer pipe, which is adapted to be attached to the vehicle in a stationary manner, an inner pipe, which is arranged in the outer pipe so as to be movable in the insertion and extension direction, an actuating device for moving the inner pipe between a transport position and an operating position, and an engagement device, which is adapted, in a first operating state, to fix the inner pipe in the operating position in relation to the outer pipe in such a way that a movement or displacement of the inner pipe in the insertion direction is prevented. Due to these features both the unlocking and the retraction and extension of the inner pipe is solved by means of a simple hand-driven or power-driven mechanism.

Thus, there is in particular provided an engagement device, which in a first operating state prevents a displacement of the inner pipe in the insertion direction. In an expedient embodiment, it may however be possible to displace the inner pipe in the extension direction.

Advantageously, the engagement device can be brought into a second operating state, in which it is possible to displace the inner pipe in relation to the outer pipe in the insertion and extension direction. To put it differently, the engagement device can thus be changed or displaced between a first and a second operating state.

Advantageously, the engagement device has an engagement means, such as an engaging pawl, with an engagement area, such as an engaging tooth, which is designed to engage into an outer pipe engagement area.

Expediently, there is provided a plurality of outer pipe engagement areas, which expediently are shaped in the form of a gear rack piece or in the form of embossed or coined parts of the outer pipe.

In a preferred embodiment, the plurality of outer pipe engagement areas is arranged in the insertion and extension direction, so that a plurality of engagement areas may engage therein simultaneously and/or the operating position of the inner pipe can be fixed in an operating area defined by the plurality of outer pipe engagement areas. Thus, there may be provided an engagement means, which has several engagement areas, which are arranged linearly in and/or transverse to the insertion and extension direction and which can engage into the plurality of outer pipe engagement areas. Due to the fact that there may be provided a plurality of outer pipe engagement areas, it is thus possible to fix the inner pipe in relation to the outer pipe in different positions along the insertion and extension direction. Said positions form the operating area.

Advantageously, there is provided a plurality of engagement means, preferably two engagement means, which are in particular adapted to engage into opposing outer pipe engagement areas by means of their engagement areas. Thus, the engagement means can act in opposing directions and, thus, engage into respective outer pipe engagement areas formed in opposing walls of the outer pipe.

Preferably, the engagement means on the inner pipe is mounted pivotably about an axis or translationally transverse, in particular perpendicular to the insertion and extension direction. Thus, the engagement means can be arranged in particular essentially stationarily in relation to the inner pipe and pivotably in relation to the inner pipe. In an alternative embodiment, the engagement means is arranged stationarily in relation to the inner pipe such that the inner pipe cannot be displaced in the insertion and extension direction, but is movable only transverse, in particular perpendicular to the insertion and extension direction in order to engage into respective outer pipe engagement areas.

Particularly preferably, the engagement device—in particular most of it—is arranged within the inner pipe. Here, the engagement device may be designed such that only the engagement means thereof projects through and beyond the inner pipe during operation.

Expediently, the engagement device has a pretensioning device such as an extension spring or a compression spring, by means of which the engagement means is pretensioned in the direction of the first operating state.

Advantageously, the engagement device is operatively connected to the actuating device such that it can be actuated or controlled by means of the actuating device.

Expediently, when the actuating device is actuated, the engagement device is brought into and/or held in a second operating state and preferably when there is a force in the insertion direction on the inner pipe, the engagement device is brought into the first operating state. The force acting in the insertion direction or the contact force is such that the inner pipe will not move further in the extension direction. This state occurs when the distal end of the inner pipe contacts the underground.

Advantageously, the actuating device has an active/driven part, which by means of a preferably flexible tensile element such as a rope preferably is operatively connected to the preferably rotationally or pivotably mounted engagement means such as in particular the engaging pawl. The engagement means, in particular the engagement area thereof, is expediently connected to the tensile element, and by means of the latter it can be made to disengage the outer pipe, and consequently the inner pipe can be lifted or lowered.

Expediently, the part of the tensile element oriented along the insertion and extension direction is shortened or made longer when the actuating device is actuated.

Also expediently, the actuating device has a drive shaft in order to actuate the active/driven part.

Preferably, the active/driven part has a locking element area for a load pressure brake, a winding area for the tensile element and preferably a driven spigot.

In a further preferred embodiment, the active/driven part in a winding area for the tensile element has a locking element area, which is no longer hidden by the tensile element only after the tensile element has been completely unwound, so that a blocking element can come into engagement with the locking element area and prevents a further rotation of the active/driven part in the unwinding direction. Such an embodiment is particularly advantageous, since the support is extended by a rotation of the active/driven part in the unwinding direction, and when it is rotated further without such preferred embodiment—although the support foot already contacts the underground—there would be an undesired rewinding of the rope in the wrong direction so that the engagement area could not come into engagement. In order to prevent this, in particular the winding area has a locking element area, which can be formed as a partial recess, into which, when the tensile element has been completely unwound, engages a blocking element advantageously designed as a detent pawl, and which blocks a further rotation in the unwinding direction when the tensile element has been unwound. The blocking element preferably may be actuated by a spring.

In a further preferred embodiment, the actuating device has a pneumatic cylinder, a motor spindle drive or another linear drive in order to drive a preferably flexible tensile element such as a rope, which is connected to the engagement means, wherein preferably at the bottom end of the drive mechanism there is provided a deflection roller for the tensile element, and the drive mechanism is preferably mounted at the top together with a belt tightener in the outer pipe.

Expediently, the supporting device further has a display device adapted to display the operating state of the engagement device. Here, preferably in the second operating state a signal pin or the like protrudes beyond the outer wall of the outer pipe.

In order that the display device or the signal pin may protrude beyond the outer pipe, the latter expediently has a vertical elongated hole oriented in the insertion/extension direction, through which hole the display device or the signal pin, respectively, can pass.

Further advantageous and preferred features are as follows:

When the outer pipe is provided with vertically displaced outer pipe engagement areas or engagement gaps in at least one side area, on a case-by-case basis an engagement means or blocking element movably mounted in the inner pipe can engage into said engagement areas or engagement gaps and prevent a movement of the inner pipe in relation to the outer pipe so that the support in the support position fulfills its function by transferring the load to the ground. For retracting the inner pipe into its transport position, advantageously at first the engagement means or blocking element is disengaged by means of a flexible tensile element fixed to the engagement means or blocking element and, as a result, the inner pipe is lifted or lowered. This results in a constructionally simple and user-friendly handling. It is advantageous to use as engagement gaps or outer pipe engagement areas for engagement preferably the tooth gaps, hereinafter referred to as engagement gaps, of at least one gear rack piece or the like, mounted in or on a wall area of the outer pipe, apart from other possible designs such as bores or the like. Here, the gear rack piece can be made in the usual manner from a semi-finished material corresponding to its cross-section or, in order to save weight, be a thinner flat material, which is embossed or coined in the shape of a gear rack. As blocking element preferably an engaging pawl having at least one tooth is provided, wherein also parts such as movable pins or bolts etc. can be used. A rope is preferred as flexible tensile element, however, also a tape or the like can be used. The vertical area of the rope fixed to the engaging pawl is shortened in a first design simply by winding it up, in order to lift the engaging pawl and to thus retract the inner pipe. The inner pipe is lowered, i.e. extended, by unwinding the rope. In order to wind up and unwind the rope there is provided a winding area about the axle of a shaft assembly. The shaft assembly consists of a driving shaft to be driven by a hand crank and an active/driven part, for example. Advantageously, the driving shaft and the active/driven part are in certain areas designed such that they form part of a load pressure brake and simultaneously serve to interconnect with each other. The load pressure brake allows for retracting and extending the inner pipe in a controlled manner and for securely holding the load in each position. Here, load means merely the weight of the mass of the inner pipe and of a foot attached thereto. Advantageously, only one load pressure brake arranged in the support to be driven takes over the holding function for both due to the fact that usually the supports are coupled in pairs via a connecting shaft. This offers an economic advantage, since in the also driven support only one winding area for the rope is required. From a manufacturing point of view it is also very favorable if the active/driven part in single-piece design has the winding area of the rope as well as the locking element area of the load pressure brake and a driven spigot. In a second embodiment of the support according to the invention, the pulling or releasing of the rope for lifting the engaging pawl or the retraction and extension of the inner pipe is done by a pneumatic differential cylinder, a motor spindle drive or the like. Here, at the free end of the downwards facing piston rod of a preferred pneumatic cylinder, there is provided a deflection roller for the rope, which is displaced upwards or downwards to achieve the respective desired movement of the rope. The above-described gear rack pieces can be fixed in the outer pipe, which preferably has a square cross-section, in the wall area such that the teeth will not project inside, wherein also the inner pipe can have a square cross-section. A preferred attachment of a gear rack piece is achieved when its teeth project on the inner wall in the outer pipe. This makes it advantageously possible to avoid a projection of the gear rack piece beyond the rear wall of the outer pipe, which possibly on a case-by-case basis might impede the attachment of the support.

For this arrangement of the gear rack piece it is suggested to provide on the inner pipe a recessed wall area running in the insertion/extension direction or longitudinal direction, the width of which exceeds the width of the gear rack piece and the depth of which is larger than the projection of the teeth protruding into the outer pipe. For arranging the gear rack piece, preferably the rear wall area of the outer pipe is to be used since a signal pin can be attached to the engaging pawl coming into engagement there in such a manner that favorably on the front side of the support it can make visible for the driver the engaged or disengaged state of the engaging pawl. In order to monitor whether the detent pawl engages, it is also possible to use an end switch, which is advantageous in terms of control in particular for the power drive. The engaging pawl is pressure-operated by means of a spring pretensioned vis-à-vis the inner pipe, which in combination with the effect produced by the operating weight of the engaging pawls contributes to a safe engagement into the tooth gaps of the gear rack piece. Advantageously, the spring is placed on a limit stop preferably fixed to the engaging pawl. Pulling the rope at first causes the engaging pawl to become disengaged, wherein the limit stop in the inner pipe becomes effective, causing the inner pipe to be entrained upwards. When the inner pipe is lowered, i.e. extended, the limit stop in the inner pipe continues to abut and the weight of the inner pipe and of the foot is lowered in a controlled manner until the foot hits the underground.

Further advantageous embodiments of the invention are defined in the claims. The invention allows for various embodiments. Two embodiments with area variants thereof will be shown and explained with reference to the Figures.

BRIEF DESCRIPTION OF THE DRAWINGS

The Figures show:
FIG. 1 shows schematically a longitudinal section (transverse to the travel direction) of a support according to the invention with manual drive, in the retracted state;
FIG. 2 shows schematically a longitudinal section, corresponding to FIG. 1, however in the extended state;
FIG. 10 shows the area Y in FIG. 2 as an alternative to FIG. 6 and FIG. 8;
and
FIG. 11 shows the area Y as an extended alternative to FIG. 8.

DETAILED DESCRIPTION OF THE PREFERRED EMBODIMENTS

Figure 3:
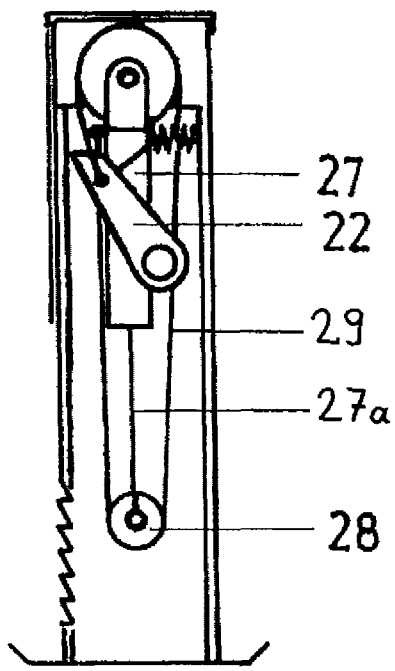
FIG. 3 shows a support according to FIG. 1, however with power drive.

The supports 10 shown in FIGS. 1 to 4 are mounted in pairs on a semi-trailer, and each pair is drivingly connected by means of a connecting shaft 11. In the transport position, the supports are retracted, i.e. in their shortened state. Before the semi-trailer is decoupled from the truck tractor, they are extended. The support 10 has an outer pipe 12 and an inner pipe 13 arranged therein in such a manner that it is movable in the longitudinal direction. The outer pipe 12 and the inner pipe 13 have essentially square cross-sections. The support 10 is fixed to the chassis of a semi-trailer (not shown) by means of a screw-on plate 14 arranged on the outer pipe 12. At the bottom end of the inner pipe 13, there is a foot 15, which can be placed on the ground. As is shown in FIGS. 1 and 2, in a manually driven embodiment, the support 10, at its front side, has a hand crank 16 driving an active/driven part 18 via a driving shaft 17. The active/driven part 18 is manufactured single-piece with a locking element area 18a (FIG. 5) belonging to a load pressure brake 19 and a winding area 18b for a rope 20 as well as a driven spigot 18c. In the lower rear wall area of the outer pipe 12, there is a gear rack piece 21 with teeth 21a and engagement gaps 21b. In the gear rack piece 21, an engaging pawl 22 pivotably arranged on an axle 23 mounted transverse to the front side of the support 10 in the inner pipe 13 can engage with an engaging tooth 22a. The pivoting range of the engaging pawl 22 is limited relative to the inner pipe 13 and by means of a limit stop 24 sitting on the engaging pawl 22. On the limit stop 24, there is arranged a compression spring 25. The compression spring 25 in addition to the effect of the weight component of the engaging pawl 22 contributes to a secure engagement of the engaging pawl 22 into one of the engagement gaps 21b of the gear rack piece 21. The bottom end of the rope 20 is fixed at the upper area of the engaging pawl 22, and the upper rope end is connected to the winding area 18b of the active/driven part 18. A part of the rope 20 is wound up in the transport position of the support 10 (FIG. 1) and is securely held by the load pressure brake 19. By turning the hand crank 16 in the counter-clockwise direction in order to bring the support 10 into its support position, the rope 20 is unwound. As a result, the inner pipe 13 moves downwards until the foot 15 rests on the ground of the parking place. Thanks to the load pressure brake 19 the lowering takes place in a controlled manner, i.e. the inner pipe 13 cannot be dragged down by its weight. The engaging pawl 22 then already engages into the gear rack piece 21 or comes into full form-fitting engagement in an engagement gap 21b of the gear rack piece 21 in the moment when the load is picked up by the support 10 when the semi-trailer is unhitched or decoupled. During hitching, the front area of the semi-trailer is slightly lifted by the air suspension of the semi-trailer, such that the support 10 becomes load-free and the load pressure on the engaging pawl 22 is relieved. Now, the rope 20 can be wound up by turning the crank in the clockwise direction. As a result, the engaging pawl 22 is pivoted away from the gear rack piece 21, wherein the limit stop 24 provided on the engaging pawl 22 abuts in the inner pipe 13. And, as a result, the inner pipe 13 is lifted up to the transport position by the rope 20.

Figure 4:
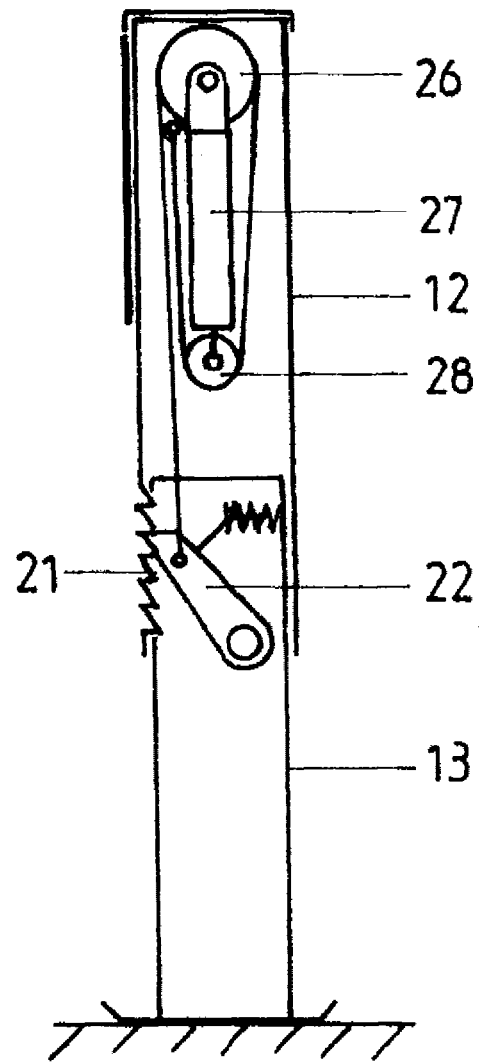
FIG. 4 shows the support according to FIG. 3, however extended.

FIGS. 3 and 4 show the support 10 in an embodiment with power drive. Here, in the upper area of the outer pipe 12, together with the bearing of a belt tightener 26 there is fixed a pneumatic cylinder 27, with a piston rod 27a, which can be extended downwards and to which a deflection roller 28 is attached. A rope 29 guided over the belt tightener 26 and the deflection roller 28 is fixed at the bottom to the engaging pawl 22 and at the top in the outer pipe 12. When the piston rod 27a of the pneumatic cylinder 27, which piston rod 27a is extended in the transport position of the support 10, is retracted, the inner pipe 13 moves downwards for unhitching the semi-trailer, and after hitching the inner pipe 13 is again brought into the transport position by extending the piston rod 27*a*. In each case, the engagement and disengagement of the engaging pawl 22 takes place as has been described above.

Figure 5:
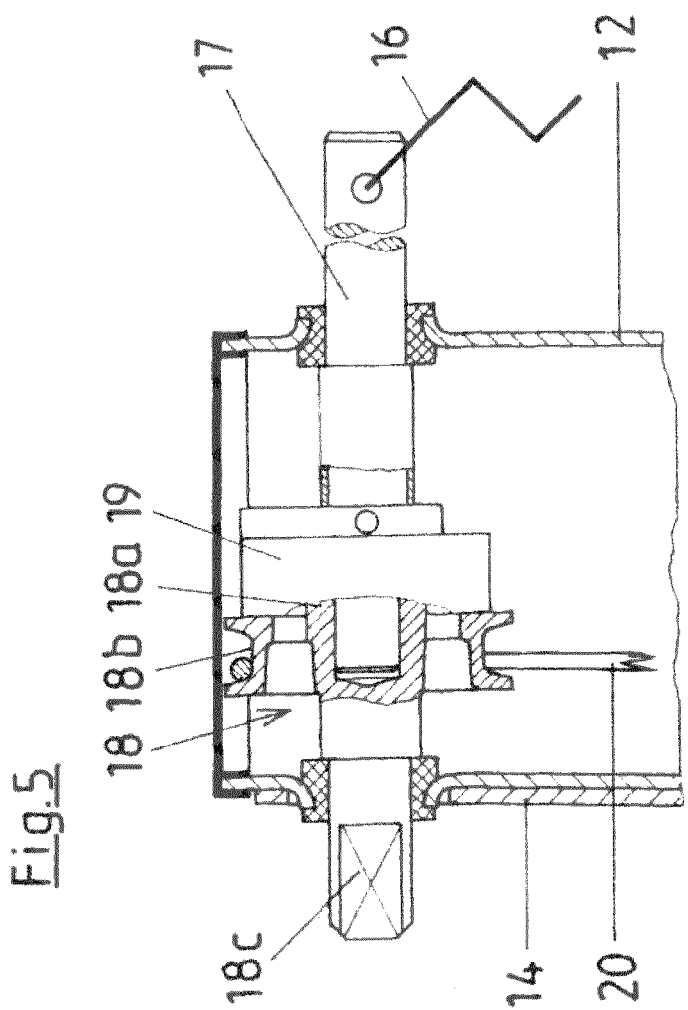
FIG. 5 shows an enlarged longitudinal section of the area X in FIG. 2.

FIG. 5 illustrates the upper area X of the support 10.

Figure 6:
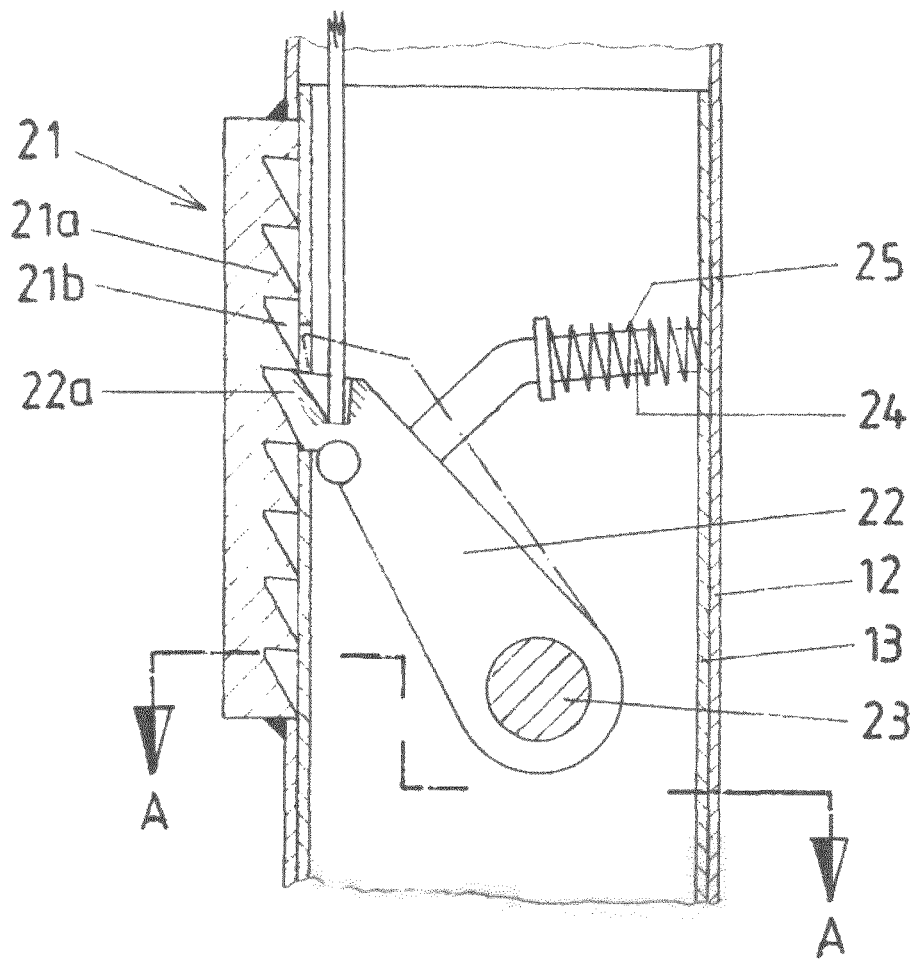
FIG. 6 shows the area Y in FIG. 2, enlarged.

FIG. 6 shows an attachment of the gear rack piece 21 in the wall area of the outer pipe 12, wherein the teeth 21*a* do not project in the outer pipe 12. The engaging pawl 22 with its engaging tooth 22*a* sits in an engagement gap 21*b* of the gear rack piece 21 in a form-fitting manner, and the limit stop 24 is spaced apart from the inner pipe 13. The disengaged state of the engaging pawl 22 is indicated by the dash-dotted line.

Figure 7:
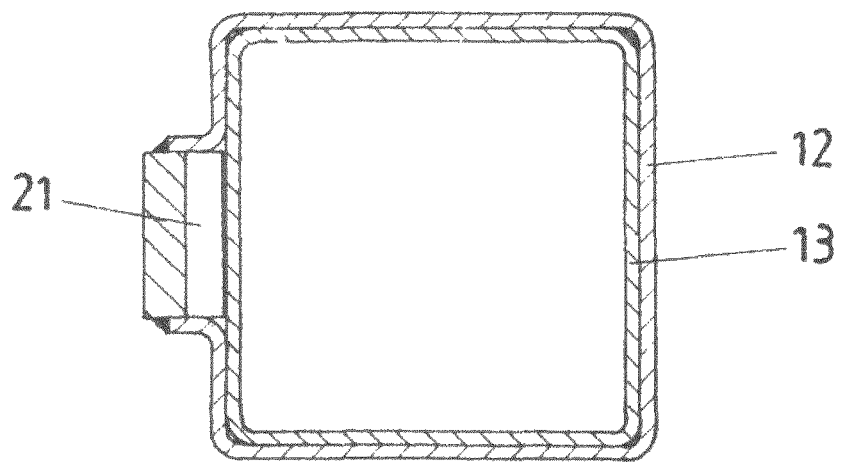
FIG. 7 shows a cross-section along the line A-A in FIG. 6.

FIG. 7 shows the attachment of the gear rack piece 21 in the section A-A of FIG. 6.

Figure 8:
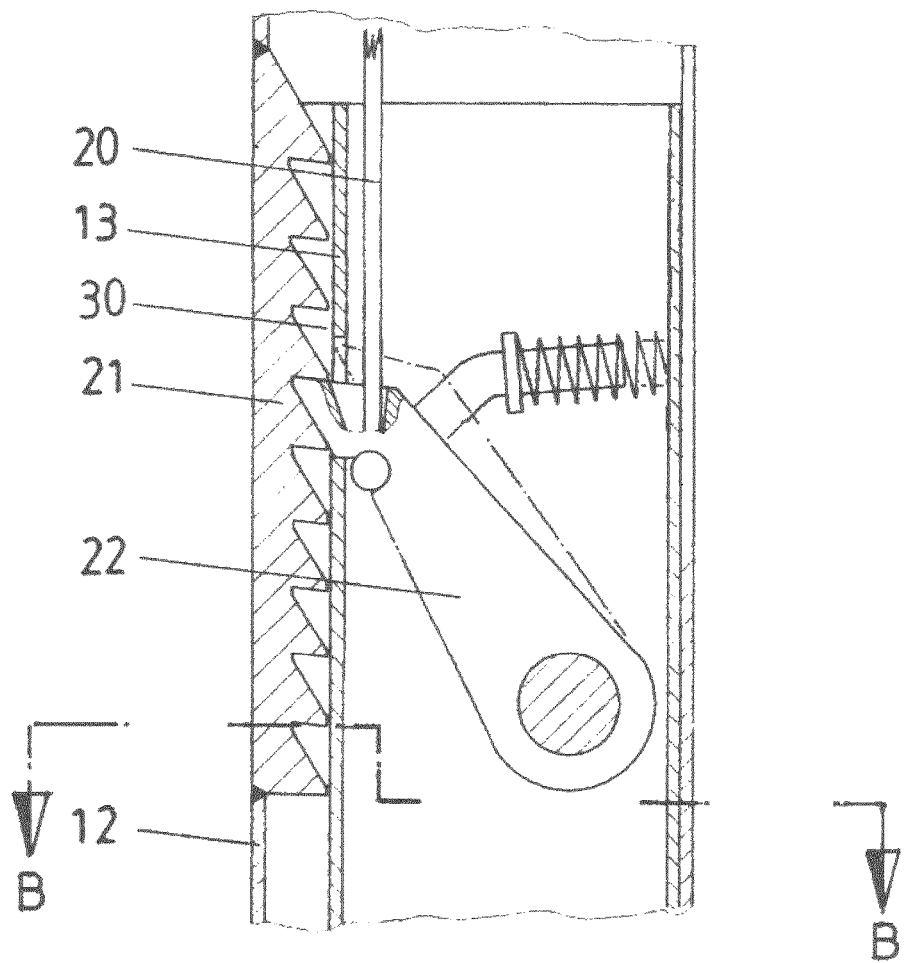
FIG. 8 shows the area Y in FIG. 2 as an alternative to FIG. 6.
Figure 9:
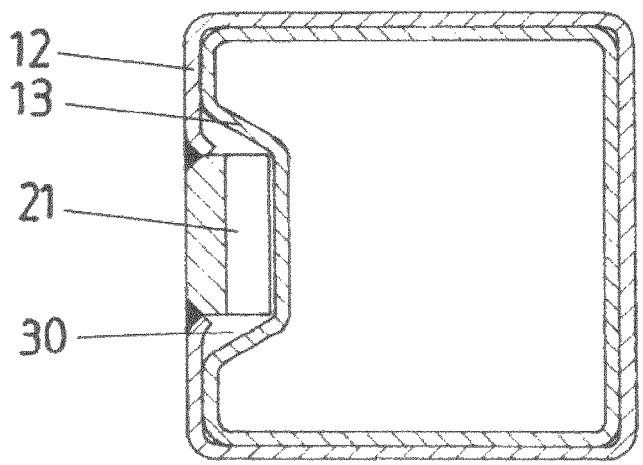
FIG. 9 shows a cross-section along the line B-B in FIG. 8.

FIG. 8 shows an arrangement of the gear rack piece 21, wherein the teeth 21*a* thereof project in the outer pipe 12. To this end, a recess 30 running in the longitudinal direction (FIG. 9 as section B-B in FIG. 8) is provided in the wall area of the inner pipe 13.

FIG. 10 shows the use of an accordingly embossed or coined part 31 instead of the gear rack piece 21.

FIG. 11 shows a signal pin 32 arranged above the engaging pawl 22. When the engaging pawl 22 comes into engagement, the signal pin 32 is retracted by a fork piece 34 fixed to the engaging pawl 22 from its position projecting at the front through a vertical elongated hole 33 in the front wall of the outer pipe 12. Thus, it is indicated to the driver that the engaging pawl 22 has come into engagement. This safeguard or acknowledgment may also be done by an end switch 35, which is the case in particular in the power-driven embodiment of the support 10.

Further exemplary features and embodiments of the supporting device or support according to the invention are as follows:

Preferably, engagement gaps in the outer area of the support 10 are not open.

Expediently, there are provided as locking gaps the engagement gaps 21*b* of a gear rack piece 21 or an accordingly embossed or coined part 31 made from a flat material.

Preferably, the blocking element is an engaging pawl 22 with at least one engaging tooth 22*a*.

Exemplary, the vertical area of the rope 20 for disengaging the engaging pawl 22 and for retracting and extending the inner pipe 13 is shortened or extended by winding up or unwinding.

Advantageously, the winding up and unwinding of the rope 20 is done about the axle of a shaft assembly consisting of a driving shaft 17 and an active/driven part 18.

Preferably, the driving shaft 17 and the active/driven part 18 are coupled via a load pressure brake 19.

Further preferably, the active/driven part 18 in one-piece design has a locking element area 18*a* of the load pressure brake 19, a winding area 18*b* for the rope 20 and a driven spigot 18*c*.

Expediently, the disengagement of the engaging pawl 22 and the insertion and extension of the inner pipe 13 is done via a rope 29 by a pneumatic cylinder 27, a motor spindle drive or another linear drive mechanism, at the bottom end of which there is a deflection roller 28 for the rope 29 and which can be mounted at the top together with a belt tightener 20 in the outer pipe 12.

Exemplary, the engaging pawl 22 is pivotably mounted in the inner pipe 13 and is pushed against the respective element with engagement gaps by means of a spring.

Preferably, there is provided a limit stop 24 limiting the pivoting range of the engaging pawl 22 in relation to the inner pipe, and after abutment against the inner pipe 13 causes the inner pipe to be entrained by the drag of the rope 20, 29 on the engaging pawl 22.

Advantageously, the limit stop 24 is attached to the engaging pawl 22.

Preferably, the limit stop 24 also serves for accommodating a compression spring 25.

Expediently, the gear rack piece 21 is fixed in the wall area of the outer pipe 12 such that the teeth 21*a* thereof will not project inside.

Preferably, the gar rack piece 21 is fixed in the wall area of the outer pipe 12 such that the teeth 21*a* project inside.

Advantageously, the inner pipe 13 in at least one wall area has a recess 30 running in the longitudinal direction, the width of which exceeds the width of the gear rack piece 21 and the depth of which is larger than the excess of the teeth 21*a* projecting into the outer pipe 12.

Preferably, the rear wall of the outer pipe 12 is used for arranging the gear rack piece 21.

Preferably, there is provided a signal pin 32, which is moved away by the engaging pawl 22, when the latter comes into engagement.

Expediently, in the front wall area of the outer pipe 12 there is provided a vertical elongated hole 33, through which the signal pin 22 enters and exits.

Advantageously, the part 31 embossed or coined in the form of a gear rack partly sits in a vertical line of horizontal slits in the wall area of the outer pipe 12.

LIST OF REFERENCE SIGNS

10 support
11 connecting shaft
12 outer pipe
13 inner pipe
14 screw-on plate
15 foot
16 hand crank
17 driving shaft
18 active/driven part
18*a* locking element area
18*b* winding area
18*c* driven spigot
19 load pressure brake
20 rope
21*a* tooth
21*b* engagement gap
22 engaging pawl
22*a* engaging tooth
23 axle
24 limit stop
25 compression spring
26 belt tightener
27 pneumatic cylinder
27*a* piston rod
28 deflection roller
29 rope
30 recess
31 embossed or coined part
32 signal pin
33 elongated hole
34 fork piece
35 end switch

The invention claimed is:
1. A supporting device of a vehicle, comprising:
an outer pipe configured to attach to the vehicle in a stationary manner;

an inner pipe arranged in the outer pipe so as to be movable in the insertion and extension direction;

an actuating device for moving the inner pipe between a transport position and an operating position; and an engagement device that is configured in a first operating state, to fix the inner pipe in the operating position in relation to the outer pipe to prevent a movement of the inner pipe in the insertion direction;

wherein the engagement device is operatively connected to the actuating device such that it can be actuated or controlled by the actuating device;

wherein the engagement device has an engagement structure with an engagement area configured to abut an outer pipe engagement area; and wherein the actuating device has an active/driven part that is operatively connected to the engagement structure via a flexible tensile element.

2. The supporting device of claim 1, wherein a displacement of the inner pipe in relation to the outer pipe is possible in the insertion and extension direction when the engagement device is in a second operating state.

3. The supporting device of claim 2, wherein the engagement structure comprises as an engaging pawl, and the engagement area comprises an engaging tooth.

4. The supporting device of claim 3, wherein the outer pipe comprises a plurality of outer pipe engagement areas.

5. The support device of claim 4, wherein the plurality of outer pipe engagement areas includes at least one of a gear rack piece, an embossed part, and a coined part.

6. The supporting device of claim 4, wherein the engagement structure engages into opposing outer pipe engagement areas by the engagement areas of the engagement structures.

7. The supporting device of claim 6, wherein the engagement structure is mounted on the inner pipe such that the engagement structure is pivotable about an axis and translationally transverse to the insertion and extension direction.

8. The supporting device of claim 7, wherein the engagement device includes a pretensioning device that pretensions the engagement structure in a direction of the first operating state.

9. The supporting device of claim 8, wherein the pretensioning device comprises at least one of an extension spring and a compression spring.

10. The supporting device of claim 8, wherein the engagement device is brought into and/or held in a second operating state when the actuating device is actuated, and the engagement device is brought into the first operating state when there is a force in the insertion direction.

11. The supporting device of claim 10, wherein the tensile element comprises a rope.

12. The supporting device of claim 11, wherein the active/driven part includes a locking element area for a load pressure brake, a winding area for the tensile element, and a driven spigot.

13. The supporting device of claim 12, wherein the active/driven part in a winding area for the tensile element includes a locking element area, which is no longer hidden thereby only after the tensile element has been completely unwound, so that a blocking element engages the locking element area and prevents a further rotation of the active/driven part in the unwinding direction.

14. The supporting device of claim 1, further comprising a display device configured to display an operating state of the engagement device, in that a signal pin projects beyond the outer wall of the outer tube in the second operating state.

15. The supporting device of claim 1, wherein the engagement structure comprises as an engaging pawl, and the engagement area comprises an engaging tooth.

16. The supporting device of claim 15, wherein the outer pipe comprises a plurality of outer pipe engagement areas.

17. The support device of claim 16, wherein the plurality of outer pipe engagement areas includes at least one of a gear rack piece, an embossed part, and a coined part.

18. The supporting device of claim 15, wherein the engagement structure engages into opposing outer pipe engagement areas by the engagement areas of the engagement structures.

19. The supporting device of claim 15, wherein the engagement structure is mounted on the inner pipe such that the engagement structure is pivotable about an axis and translationally transverse to the insertion and extension direction.

20. The supporting device of claim 15, wherein the engagement device includes a pretensioning device that pretensions the engagement structure in a direction of the first operating state.

21. The supporting device of claim 20, wherein the pretensioning device comprises at least one of an extension spring and a compression spring.

22. The supporting device of claim 1, wherein the engagement device is brought into and/or held in a second operating state when the actuating device is actuated, and the engagement device is brought into the first operating state when there is a force in the insertion direction.

23. The supporting device of claim 1, wherein the tensile element comprises a rope.

24. The supporting device of claim 23, wherein the active/driven part includes a locking element area for a load pressure brake, a winding area for the tensile element, and a driven spigot.

25. The supporting device of claim 23, wherein the active/driven part in a winding area for the tensile element includes a locking element area, which is no longer hidden thereby only after the tensile element has been completely unwound, so that a blocking element engages the locking element area and prevents a further rotation of the active/driven part in the unwinding direction.

* * * * *